United States Patent
Lewe et al.

(10) Patent No.: US 12,381,458 B2
(45) Date of Patent: Aug. 5, 2025

(54) METHOD FOR PRODUCING A LAMINATION STACK, LAMINATION STACK AND ELECTRIC MACHINE

(71) Applicant: ThyssenKrupp Steel Europe AG, Duisburg (DE)

(72) Inventors: Tobias Lewe, Münster (DE); Karsten Machalitza, Mülheim an der Ruhr (DE); Christian Wiethoff, Marl (DE); Marco Tietz, Düsseldorf (DE); Volker Kamen, Herne (DE); Anne Hennig, Bönen (DE); Dirk Schreier, Lauter-Bernsbach (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 358 days.

(21) Appl. No.: 17/910,744

(22) PCT Filed: Jan. 25, 2021

(86) PCT No.: PCT/EP2021/051570
§ 371 (c)(1),
(2) Date: Sep. 9, 2022

(87) PCT Pub. No.: WO2021/204433
PCT Pub. Date: Oct. 14, 2021

(65) Prior Publication Data
US 2023/0119661 A1   Apr. 20, 2023

(30) Foreign Application Priority Data
Apr. 9, 2020 (DE) ............ 10 2020 109 985.1

(51) Int. Cl.
*H02K 15/02* (2025.01)
*H01F 1/18* (2006.01)
(Continued)

(52) U.S. Cl.
CPC ............ *H02K 15/02* (2013.01); *H01F 1/18* (2013.01); *H01F 3/02* (2013.01); *H01F 41/0233* (2013.01);
(Continued)

(58) Field of Classification Search
CPC .......... H02K 15/02; H02K 3/12; H02K 3/345; Y10T 29/49009
(Continued)

(56) References Cited

U.S. PATENT DOCUMENTS 4,464,220 A   8/1984 Beer
10,391,741 B2 *  8/2019 Fluch ............... H01F 3/02
(Continued)

FOREIGN PATENT DOCUMENTS

CN   1798787 A   7/2006
CN   102204282 A   9/2011
(Continued)

OTHER PUBLICATIONS

Bbrecher, Christian ; Weck, Manfred: Werkzeugmaschinen Fertigungssysteme 1—Maschinenarten und Anwendungsbereiche. 9th edition. Berlin : Springer Vieweg, 2019 (VDI book). p. 65.—ISBN 978-3-662-46564-6.
(Continued)

*Primary Examiner* — Thiem D Phan
(74) *Attorney, Agent, or Firm* — Rankin, Hill & Clark LLP

(57) ABSTRACT

The invention relates to a method for producing a lamination stack, e.g. a stator package or a rotor package. The method comprises the following steps: A) providing a metal sheet (1) with an adhesive coating; B) transporting the metal sheet in an in-line system comprising a cutting means (4), a separating means (6) and an activation means (5, 5a 5b); C) cutting a molded part (2) with the cutting means (4); D)
(Continued)

activating the adhesive coating; E) separating the molded part (2); F) placing the molded part (2); G) repeating steps C) to F), wherein the adhesive coating of some molded parts (8) is provided with a treatment fluid by means of a treatment device (9) in order to allow for target breaking points for separating a molded part stack (3, 3'). In some cases a subsequent compaction can be carried out by a compaction station (7). The invention also relates to a lamination stack and an electric machine.

22 Claims, 3 Drawing Sheets

(51) Int. Cl.
H01F 3/02 (2006.01)
H01F 41/02 (2006.01)
H02K 15/026 (2025.01)

(52) U.S. Cl.
CPC ...... *H02K 15/026* (2013.01); *Y10T 29/49009* (2015.01)

(58) Field of Classification Search
USPC .................................. 29/596, 598, 609, 732
See application file for complete search history.

(56) References Cited

U.S. PATENT DOCUMENTS

| | | | | |
|---|---|---|---|---|
| 11,872,619 | B2* | 1/2024 | Omura | H02K 1/02 |
| 2007/0027274 | A1 | 2/2007 | Antelmann et al. | |

FOREIGN PATENT DOCUMENTS

| | | |
|---|---|---|
| CN | 102738976 A | 10/2012 |
| DE | 3829068 | 2/1990 |
| DE | 102009028180 | 2/2011 |
| DE | 102012001744 | 8/2013 |
| DE | 102012005795 | 9/2013 |
| DE | 102015012172 | 3/2017 |
| EP | 2883692 | 6/2015 |
| GB | 1293142 | 10/1972 |
| JP | 57-074377 | 5/1982 |
| JP | 58-047051 | 3/1983 |
| JP | 62-030581 | 2/1987 |
| JP | 05-304037 | 11/1993 |
| JP | 11-254642 | 9/1999 |
| JP | 2001-078399 | 3/2001 |
| JP | 2007-504341 | 3/2007 |
| JP | 2015174885 | 10/2015 |
| JP | 2018-534388 | 11/2018 |
| JP | 2019-537920 | 12/2019 |
| KR | 20150095700 | 8/2015 |
| KR | 20180053713 | 5/2018 |
| KR | 20190051812 | 5/2019 |
| WO | 2018216565 | 11/2018 |
| WO | 2019088618 | 5/2019 |
| WO | WO2019088009 | 5/2019 |

OTHER PUBLICATIONS

Habenicht, Gerd: Kleben—erfolgreich und fehlerfrei. Handwerk, Praktiker, Ausbildung, Industrie. 7th revised and updated edition, Wiesbaden : Springer, 2016, pp. 82, 86, 115, 173-174.—ISBN 978-3-658-14695-5.
Hheindl, Albert: Praxisbuch Bandtrocknung—Grundlagen, Anwendung, Berechnung. Heidelberg : Springer Vieweg, 2016. pp. 120-121.—ISBN 978-3-642-53904-6.
Kampker, Achim: Elektromobilproduktion. Berlin: Springer, 2014, p. 145.—ISBN 978-3-642-42021-4.
Office Action of German Patent Application No. 10 2020 109 985.1 dated Dec. 14, 2022, 10 pages.
Office Action of Japanese Patent Application No. 2022-557077 dated Aug. 29, 2023, 7 pages.
International Search Report (English and German) and Written Opinion of PCT/EP2021/051570 dated May 28, 2021, 19 pages.
Japanese Office Action of Application Serial No. 2023-193042 dated Dec. 17, 2024. 2 pages.
Office Action of Chinese Application No. 202180027173.0 dated Jun. 12, 2025, 8 pages.
Search Report of Chinese Application No. 202180027173.0 dated Jun. 9, 2025, 3 pages.

\* cited by examiner

METHOD FOR PRODUCING A LAMINATION STACK, LAMINATION STACK AND ELECTRIC MACHINE

BACKGROUND

The subject disclosure relates to a method for producing a lamination stack. The subject disclosure also relates to a stacked section of the lamination stack and an electric machine.

The mode of operation of electric machines of various kinds, in particular electric motors, has long been known. The electric motor continues to gain in importance, not least in light of the increasing use of electric motors in individualized passenger transport, often also referred to with the buzzword "electromobility." Substantial components of every electric motor include a stator and a rotor, the term "stator" denoting a stationary part of the motor and the term "rotor" denoting a moving part of the motor.

One challenge when providing electric motors is to increase the efficiency of the electric motor, for example the provided power per volume and/or the efficiency, as part of an effort that makes economical sense.

One concept for providing efficient electric motors is the production of stators and/or rotors or of parts of the stators and/or rotors as a so-called stator package or rotor package. Other components to be manufactured are pole cores or segments. In this case, said components are assembled as lamination stacks, also known as plate stacks, from individual so-called lamellae. The term "lamella" denotes a molded part taken from an electrical steel sheet or electrical steel strip, for example by punching. The plate stacks consist of a large number of thin lamellae which are stacked together and are electrically insulated from one another, either partially or preferably completely. For such purposes, for example, the use of so-called electrical insulating coatings, which are classified in so-called insulation classes, is known from practice.

The production of such a lamination stack always comprises the steps of producing lamellae and interconnecting the lamellae. The connection is preferably established in such a way that, after the connection, the lamellae are partially, preferably completely, electrically insulated from one another, which preferably means that two adjacent lamellae are not galvanically interconnected.

The individual lamellae can be produced by punching, for example. The connection of the punched lamellae to form a lamination stack can be achieved using a variety of known methods, for example by bolting together, applying clips, welding or by punch-stacking. However, due to the mechanical effect generated during the connection process, each of these production methods known to a person skilled in the art is associated with a negative impact on the electromagnetic properties of the finished lamination stack that prevail after the connection. In particular, mechanical stresses, which are inevitable in a connection produced according to the prior art, can at least to some extent have a negative impact on the magnetic properties and the shape of magnetic field lines within the lamination stack, which, for example, directly results in a negative impact on the efficiency of the electric motor produced therefrom. Electrical connection between two or more lamellae, which occurs in some connection processes, for example punch-stacking or welding, results in additional losses.

An elegant option for reducing the negative impact of mechanical effects on the lamellae and at the same time achieving good insulation among the lamellae is to use adhesives as a connecting means. Suitable adhesive systems also often have insulating properties similar to electrically insulating coatings.

A procedure known to a person skilled in the art is the use of so-called baking coatings. For example, the use of baking coatings for gluing punched electrical steel sheets together is described in DE 38 29 068 C1. One procedure for using baking coating is the coating of metal sheet, in particular metal sheet strip, subsequent punching out of individual lamellae from the metal sheet, aligned positioning of the individual lamellae with respect to one another and subsequent heat treatment of the resulting lamination stack for a defined period of time and at a defined temperature. In many cases, the lamellae are pressed against one another during the heat treatment, for example by applying a force to the end face, preferably with a uniform surface force, in an axial direction of the lamination stack, the force being directed into the interior of the lamination stack. Typical reaction temperatures are 150 degrees Celsius to 250 degrees Celsius, and a typical time for the baking coating to react is 30 to 150 minutes with a subsequent cooling phase, although the exact parameters depend naturally on the specific baking coating used and the specific geometry present, since, for example, a core temperature that sets up in the component has an effect on the course of the baking coating process. Excellent electromagnetic properties of stator packages and/or rotor packages can generally be achieved using this procedure. Due to the time-consuming procedure, however, it is immediately apparent that the use of baking coatings is not, or at least not optimally, suitable for continuous mass production.

SUMMARY

Against the background of the above, an object of the subject disclosure is to create the prerequisites for the efficient production of lamination stacks, i.e. in particular stator packages or rotor packages, in a production environment.

In addition, against the background of the desire for further increased efficiency, it is also an object of the subject disclosure to provide electromagnetic components and electric machines with improved conversion of electromagnetic energy into mechanical energy or vice versa.

The object is achieved with a method according to claim 1, a stack section of a lamination stack according to claim 16 and an electric machine according to claim 17.

The inventive method for producing a lamination stack for an electric machine comprises at least the following steps:

A) A metal sheet is provided which is provided with an at least partially curable adhesive coating. This means that the metal sheet has an adhesive coating which, after activation, for example thermally triggered activation, hardens and thereby realizes its adhesive properties. The adhesive coating is a polymer-based adhesive coating. The metal sheet is preferably coated with the adhesive coating over its entire surface, either on one side or, particularly preferably, on both sides. The metal sheet can be an electrical steel strip or a plate cut out of a metal sheet strip.

B) The metal sheet is transported into an inline system. The inline system has at least: a cutting means, a separating means and an activating means for activating the adhesive coating. The activating means is preferably disposed between the cutting means and the separating means.

The term "inline system" refers to the fact that a number of processing stations, namely at least those mentioned above, are arranged in a predefined sequence, and metal sheet, for example an electrical steel strip, which is fed into the inline system is processed automatically and sequentially at the predefined stations.

The cutting means is used to form structures of the lamella to be produced. This can be done, for example, in a plurality of steps with one cutting means or in a plurality of steps with different cutting means, in which case in both cases a multi-step structuring is preferably performed in a lamella from inside to outside, i.e. a number of cutting processes which require a plurality of cuts are preferably provided in such a way that the cutting processes first form the innermost structures in a lamella and then gradually cut to the outside of the lamella.

The cutting means can be designed as a punch, for example. In this case, the cutting of step C) is a punching process.

The cutting means can also be in the form of a laser. The cutting of step C) is then a laser beam cutting process.

The inline system can also have a sequence of a plurality of cutting means, for example designed as a punching tool with a plurality of sequentially arranged punching stages or as a sequence of a punching tool and a laser. The at least one cutting means can be designed as a progressive die with which the predefined geometry of the lamina is punched into the electrical steel strip, preferably from the interior of the lamellae to the exterior of the lamellae.

In the above context, the term "lamella" denotes a molded part obtained by cutting it out of the metal sheet, in particular a molded part obtained by punching.

The activating agent for activating the adhesive coating is capable of introducing heat into the adhesive coating, it being possible in principle for the heat input to be generated in any manner. In particular, the activation means can have a means for emitting infrared radiation, for example an NIR emitter, i.e. a light source that is designed to emit electromagnetic radiation in the NIR wavelength spectrum, i.e. with wavelengths between 400 nm and 10 µm, preferably between 780 nm and 3 µm.

Alternatively or additionally, the activation means can involve inductive heating, in particular can comprise induction coils, for heating the adhesive coating.

Furthermore, as mentioned, the inline system has a separating means. This separating means is preferably in the form of a cutting die which uses a force perpendicular to the surface of the metal sheet to sequentially separate the lamellae by cutting them from the metal sheet which contains the outside of the lamellae and, preferably in the same process step, transports the lamellae to a receiving device arranged underneath the metal sheet in which the lamellae are collected. The cutting die preferably punches the outer boundary of the lamella out of the metal sheet. It is preferable for the cutting means and the separating means to be part of the same press, with the advantage that the punching and pushing out are highly synchronized.

C) A molded part is cut out of the metal sheet provided in step A using the cutting means, for example it is punched out in one or more steps, for example a rotor lamina or a stator lamina. Within the inline system, an electrical component, in particular a molded part designed as a stator lamina or a rotor lamina, is cut from the metal sheet provided in step A) using the cutting means, wherein the outer contours have preferably not been formed yet, the outer contours only being formed in step E). In this case, following step C) the molded part has all of its contours apart from its outer contour. Alternatively, an embodiment can be provided in which the cutting of the molded part also includes the cutting of the outer contour.

D) Activation of the adhesive coating, preferably full-area activation of the adhesive coating, by way of the activating agent for activating the adhesive coating of the molded part. The molded part formed in step C) is preferably activated, that is to say: step D) activation occurs after the cutting of step C). The adhesive coating is activated by way of heat input and the punched-out molded part is able to form an adhesive bond, i.e. to become pre-fixed. The term pre-fixing refers to the fact that the molded part is sufficiently resilient to further processing, but is not yet sufficiently fixed for industrial use of the finished lamination stack. The adhesive bond is at least partially chemically cured and its final strength can be increased later in the process by post-densification under pressure and/or temperature.

In a special embodiment it can be provided that the activation temperature in the inline system is between 30 degrees Celsius and 180 degrees Celsius, preferably between 40 degrees Celsius and 120 degrees Celsius, particularly preferably between 50 degrees Celsius and 100 degrees Celsius.

E) Separating the molded part using the separating means and, as step F), placement of the molded part, preferably guided over its external geometry, in a positioning area for building a molded parts stack. The positioning area serves to position the molded part in a position-oriented and/or angularly aligned manner onto other molded parts that are already present in the positioning area. As a result, a molded parts stack aligned with one another and provided with activated adhesive is finally obtained molded part by molded part in a sequentially increasing manner. The separating of the lamella from the metal sheet using the separating means, which is preferably performed as punching, preferably takes place in the same process step with the placement of the molded part in the positioning area, i.e.: the separating of step E) and the placement of step F), which includes the preferred gluing of the lamella to the respective previous lamella preferably takes place in the same process step, which includes guidance and, if appropriate, pressure being exerted by the separating means onto the molded parts stack being formed.

The positioning area can be, for example, a cylindrical tube adapted to the outer geometry of the molded part, for example a circular-cylindrical tube in the case of molded parts which are inscribed in a circle, the tube lying below the transport plane of the molded part. The alignment of the molded part takes place through the positioning area, which is for example designed as a cylindrical hollow tube with a lateral-surface cross section which substantially corresponds to the cross section of the molded parts and is aligned therewith in the positioning as provided. The positioning area can also correspond to an image of the lamella and thus be in contact with the positioning area over the entire surface area.

G) Steps C) to F) are carried out in the order provided, for example in the order C)→D)→E)→F) or in the order C)→D)→E) together with F), then repeated, with the molded parts stack being stacked continuously, i.e. molded parts being continuously positioned in the positioning area. This is preferably done in such a way that the positioning area is continuously completely filled.

The entire process can also be multi-row, i.e. two or more than two lamellae are punched out of an electrical steel strip in parallel and/or one after the other (depending on the number, geometry and arrangement, diagonally offset or rotated in relation to one another).

When a predefined number of molded parts has been reached, the next molded part is then provided with a treatment fluid at least in some areas using a treatment device so that the effect of the adhesive coating, i.e. the adhesive strength, is reduced, i.e. it has less or no longer any adhesive strength, so that the adhesive coating at this position allows improved separability of a stack portion below the adhesive coating of reduced effect from a stack portion above the adhesive coating of reduced effect. The separability is present at the adhesive coating, and as such the adhesive coating is provided as a target breaking point at which the lamellae directly adjacent to the adhesive coating can be easily separated from one another.

In other words: By continuously repeating steps C) to F), a treatment fluid is applied to selected molded parts at least in some areas using a treatment device so that the effect of the adhesive coating, i.e. the adhesive strength, of these selected molded parts is reduced and a stack section below the adhesive coating of reduced effect can be separated more easily from a stack section above the adhesive coating of reduced effect. The molded parts are selected as selected molded parts in such a way that the resulting stack section, which has a desired number of molded parts and thus a desired molded part height, can be separated from the positioning device below the receiving side of the positioning device while the process continues continuously, the stack section thereby being provided as a lamination stack.

A molded parts stack is thus continuously formed and is subdivided into stack sections, with one stack section in each case being separated from the molded parts stack as a lamination stack, preferably continuously.

For example, it can be provided that with each molded part that is placed onto the molded parts stack on the top side of the positioning area, the bottom side is moved out by the thickness of a molded part and that as soon as a complete stack section exists at the bottom side, it is separated and is then ready as a lamination stack while the top is continuously being filled up.

In addition to the use of a treatment fluid, the heating, i.e. the activating agent, can also be deactivated in the area in which the treatment fluid is applied, preferably only temporarily during the handling of the selected molded part.

The application of treatment fluid, at least to some areas of the molded part, takes place before step F), but preferably before step E), also preferably after step C), particularly preferably after step D), i.e. particularly preferably as an additional step between step D) and step E).

The molded part is preferably provided with the treatment fluid over the entire surface on one of its surfaces, alternatively the molded part is provided with the treatment fluid over the entire surface on both of its surfaces.

One variant provides that the molded part is provided with the treatment fluid on one of its surfaces, namely on the opposite surface to the separating means. This provides the advantage that unintentional transfer of the treatment fluid by the separating means to a subsequent molded part is avoided.

The predefined number reached is to be understood in the sense that a plurality of predefined numbers can also be specified, a reduction in effect being brought about after reaching said numbers such that, depending on the specification or specifications, the reduction in effect is also achieved more than once before the desired number of molded parts is reached. This then provides a molded parts stack which has at least one target breaking point, or in a case in which a plurality of predefined numbers was specified: has a plurality of target breaking points. At the target breaking point or the target breaking points, the molded part stack can be divided into two or more stack sections, which preferably takes place continuously during the ongoing process. The number of target breaking points in the molded parts stack before separation of a lamination stack depends solely on the height of the stack sections and on the height of the positioning area.

The treatment device is preferably disposed behind the activating means, i.e. it is arranged in such a way that a molded part first passes through the activating means, whereupon the treatment of the adhesive coating takes place.

Alternatively, the treatment device is disposed after the cutting means, but before the activating means.

In other words: A molded parts stack is formed in the positioning area up to a total intended total height, the molded parts stack being ready as a lamination stack when the total height is reached, i.e. a lamination stack with the desired number of molded parts which has one target breaking point or a plurality of target breaking points. A target breaking point as such is characterized in that the adhesion of two adjacent molded parts is less than the adhesion of two adjacent molded parts outside of a target breaking point. The target breaking points are formed in the manner described above by reducing the effect of the adhesive, i.e. its possible adhesive force, after a predefined number of molded parts. This can also be repeated several times when forming a molded parts stack in the positioning area. For example, a molded parts stack having a desired number N of molded parts can have a target breaking point after having reached N/n molded parts, respectively, the effect of which is that the adhesive coating is less effective for every N/nth molded part, with the result being that the molded parts stack has (n−1) target breaking points and can be divided into n smaller stack sections. Here, N is a whole number which is divisible by the whole number n.

As in the example above, it can be provided that, until the desired number of molded parts is reached, all of the subsequent predefined numbers of molded parts that have been reached have the same spacing so that the desired number of molded parts forms a lamination stack that has target breaking points distributed equidistantly, it then being possible to separate the stack sections of the same height at said points.

As an alternative, it can be provided that until the desired number of molded parts is reached, predefined numbers of molded parts in succession are spaced apart from one another, respectively, if required for the desired number of molded parts to form a lamination stack that has target breaking points for separating stack sections from one another that have different heights.

The stack sections are removed separately from a molded parts stack, with the stack sections being separated, for example manually, at the reduced-effect adhesive coatings acting as target breaking points based on the adhesive force still in effect between two stack sections. The individual stack sections are then available as a finished lamination stack, for example as a finished stator, as a finished rotor or as a finished segment of a stator or rotor.

A special embodiment with metal sheet laminations bonded over the entire surface has the advantage that integral sealed cooling channels can be provided. This is particularly advantageous when different or even incompatible cooling media are used in a plurality of electrical components (e.g. rotor and stator). The cooling channels can be stamped into the lamella or can be provided between the lamination stack and the adjacent component, for example the shaft or the housing.

It is pointed out that a stator and possibly also a rotor can also be composed of a plurality of segments.

Step G) therefore provides that a target breaking point or a plurality of target breaking points are implemented in the molded parts stack that fills the entire positioning area, with the target breaking point or the target breaking points being produced by a subjecting a molded part which is at the target breaking point during the course of steps C) to F) to an additional step. The additional step consists of providing the molded part located at the target breaking point with a treatment fluid at least in areas, preferably over the entire surface, in order to reduce the effect of the adhesive coating of this molded part.

In one variant, the molded part coated with the treatment fluid can be provided with the treatment fluid on only one surface. This surface is then located at the target breaking surface of the molded part.

In an alternative variant, the molded part coated with the treatment fluid can be provided with the treatment fluid on both surfaces. The molded part is then located at two predefined breaking surfaces, the molded part serving as a sacrificial lamella which is not part of a stack section.

The term "metal sheet" generally denotes a rolled product made of a metal material and, in addition to a light-gauge metal sheet or a thick-gauge metal sheet, can in particular also denote a metal strip, a metal strip or a metal sheet, for example made of a soft magnetic material, a steel strip or an electrical steel strip. Other methods of manufacturing the metal sheet can optionally be used.

The lamination stack is preferably either a stator package or a rotor core. In addition to the adhesive, the lamination stack consists of so-called lamellae, which is why it could also be referred to as a lamination stack.

According to an advantageous development of the method described above, the activation means has a first infrared illuminant. Using the first infrared illuminant, the adhesive coating is illuminated with infrared radiation and activated by the heat input caused by it.

In other words, a temperature sufficient for activation is brought about in the metal sheet, and in particular in the adhesive, for example by illuminating for a period of between 0.05 and 1 second at an emission power required to reach the activation temperature, which in turn obviously depends on the precise choice of adhesive and the characteristics, in particular the surface and the material, of the molded part, and which can be determined easily by a person skilled in the art entrusted with implementing aspects of the subject disclosure.

Particularly preferably, the activating means, or the plurality of activating means, is or are disposed between the cutting means and the separating means and has or have at least one upper infrared illuminant which is directed in a punching direction onto the first metal sheet surface. Alternatively, the activating means includes at least one lower infrared illuminant located past the side of the metal sheet on which the cutting means is located and directed opposite to a punching direction. Alternatively, both at least one upper and at least one lower infrared illuminant can be provided. The alignment of the infrared illuminant infrared illuminants relative to the lamella surface does not necessarily have to be at a right angle, but can also be at a different angle.

In particular in a case in which an upper and a lower infrared illuminant are present, if the metal sheet used is provided on both sides with an adhesive coating, it is possible to activate the adhesive in a particularly suitable manner both on a first and on the opposite second metal sheet side, with the advantageous result that excellent adhesion of the metal sheets to one another can be expected.

According to a development, the activation means has a second infrared illuminant. The first infrared illuminant and the second infrared illuminant emit infrared radiation of different wavelengths to activate the adhesive coating at different activation depths. For example, it can be provided that the first infrared illuminant emits infrared radiation at a wavelength between 780 nm and 1200 nm and/or the second infrared illuminant has infrared radiation at a wavelength between 1200 nm and 3000 nm. With such an arrangement, due to the wavelength-dependent different penetration depths, a more uniform, and with regard to depth in particular a more continuous, activation of the adhesive coating can be brought about. This is accompanied by the advantages of particularly good adhesion and/or particularly good force absorption capacity.

Such an arrangement can also be referred to as dual activation. Again, this can be done on one or both sides.

Alternatively, or additionally, the activating means can have induction heaters with the advantage that when the metal sheet is inductively heated, the adhesive is activated starting from the adhering surface of the metal sheet with the adhesive coating, so that good activation and subsequent adhesion of the adhesive is achieved.

In a special development, the strip is preheated before it enters the cutting means, for example by means of inductive heating. This has the advantage that the activation within the press requires less heat, or the total amount of heat introduced is increased and the bond thus meets higher requirements, for example with regard to mechanical properties.

Another advantage of preheating is a reduction in the pressing force and the well-known advantages as a result, and a lower deformation load and less introduction of internal stresses. This effect can be achieved particularly well if, in addition, further optional adjustments are made to the cutting tools that are familiar to a person skilled in the art.

In a further development, some or many, preferably all, of steps B) to E) take place within a housing of the inline system in order to keep the heat introduced inside the overall system as far as possible, with the advantage of a higher energy efficiency of the overall process.

Furthermore, the inline system can be actively heated in sections or as a whole, at the strip inlet and the post-compaction station. For this purpose, the commonly used oil heating of press frames and tool holder is expanded to include heating of the tool, the post-compaction station and/or the interior, for example by means of a blower with an electric heating cartridge, preferably in counterflow.

In a special embodiment it can be provided that the activation temperature in the inline system is between 30 degrees Celsius and 180 degrees Celsius, preferably between 40 degrees Celsius and 120 degrees Celsius, particularly preferably between 50 degrees Celsius and 100 degrees Celsius, and that in the post-compaction station post-compaction is carried out at a temperature that is greater than the activation temperature. Variants are provided in further developments, according to which the treatment device has a coating unit with which the molded part is coated at least in areas with a treatment fluid applied to the adhesive coating as treatment of the adhesive coating. The treatment fluid serves to reduce the effect of the adhesive on a molded part selected for this purpose after a predefined number of molded parts has been reached, so that the resulting molded parts stack has a kind of target breaking point at this point which allows separation of two stack sections which are arranged one on top of the other. The coating unit can, for example, be an application roller or a roller unit consisting of two application rollers rotating in opposite directions, the roller or roller unit running over a molded part selected for this purpose parallel or perpendicular to the direction of transport of the molded parts in the inline system in order to coat it.

Provision can be made for the selected molded part to be provided with the treatment fluid on one or both sides. If the molded part is coated on both sides with the treatment fluid, the molded part can be separated from a respective stack section on both sides and can then be removed as scrap without any further function.

The molded part is preferably coated with the treatment fluid over its entire surface.

A punching oil is preferably applied to the adhesive coating as the treatment fluid, the advantage being that it is easy to obtain and is also suitable because punching oil is unavoidably used in the process anyway, so no undesirable reactions are to be expected due to the use of another type of substance.

The punching oil is preferably a self-evaporating punching oil.

A non-water-soluble cooling lubricant, for example, can be used as the punching oil, in particular a medium-viscosity metalworking oil for non-cutting forming.

An oil free from chlorine and heavy metals such as barium is used, for example, which is suitable for deep-drawing operations and ensures a homogeneous lubricating film due to its adhesive and wetting properties. It is more preferable for the oil to have a viscosity of 80 to 110 $mm^2/s$, preferably 90 to 100 $mm^2/s$ at 40° C. and a flash point of >150° C., preferably >170° C. In particular, the oil should contain phenol and isopropylated phosphate, preferably in a 3:1 ratio, and optionally triphenyl phosphate in a proportion of 5% by weight.

For example, an oil such as that sold by Castrol under the trade name Iloform FST 16 as of the filing date of this application can be used.

Alternatively, or additionally, an illuminant can be used with which the adhesive coating is overexposed as a treatment of the adhesive coating. For example, an infrared illuminant used for activation can be used for overexposure by briefly increasing the luminous power of the infrared illuminant for a selected molded part, for example using a control system, and/or by increasing the dwell time of the molded part under the infrared illuminant by temporarily slowing down or stopping the transport of the molded parts.

Alternatively, or additionally, a cooling liquid, for example liquid nitrogen, can be applied to the adhesive coating by means of a wetting unit as treatment of the adhesive coating.

In step F) the mold parts are placed in the manner according to aspects of the subject disclosure, they are also compacted using an axial force, that is to say a force pointing perpendicular to the flat surface, for example by way of a pressing ram, preferably either after each placed molded part, or after a certain predefined number of a plurality of placed molded parts, or after forming the molded parts stack. The axial force supports the forces resulting from the intrinsic weight of the molded parts, but is significantly lower than the forces applied during any post-compacting.

Particularly preferably, after a stack section has been separated, the stack section is post-compacted in a press with a pressure on the end face, i.e. a pressure perpendicular to the lamellae surface, preferably constant over the end face, the pressure being between 10000 $N/(14000\ mm^2)$ and 200000 $N/(10000\ mm^2)$, preferably between 50000 $N/(14000\ mm^2)$ and 150000 $N/(10000\ mm^2)$, at a molded part stack temperature of between 30 degrees Celsius and 180 degrees Celsius, preferably between 40 degrees Celsius and 120 degrees Celsius, particularly preferably between 50 degrees Celsius and 100 degrees Celsius. The compaction takes place in a two-stage process, the first stage being the formation of the molded part stack in step F) or the formation of a stack section of the molded part stack in step F), and the second stage being post-compaction. It has been shown that a two-stage compaction brings about a significant increase in adhesion, namely about a doubling of the force to be applied in a top-pull test for separating a stack section. Exemplary measurements are described below. Other proven benefits include improved heat dissipation and a more than 5 percent increase in shear strength of the entire composite.

The precise matching of the temperatures and pressures is to be carried out by a person skilled in the art—taking into account the cycle time and economic aspects—and can also depend on the ratio of adhesive thickness to metal sheet thickness and on the selected configuration of the activating means, but also in particular can depend on the requirements of the component to be created.

The temperature of the molded parts stack is between 30 degrees Celsius and 180 degrees Celsius, preferably between 40 degrees Celsius and 120 degrees Celsius, particularly preferably between 50 degrees Celsius and 100 degrees Celsius and is preferred to be achieved by heating the molded parts stack in the positioning device using an illuminant which generates heat, the illuminant alternatively being disposed in or next to the separating means and/or using an induction device, and utilizing the residual heat resulting from this heating in the above-mentioned area for post-compacting.

The compaction step is carried out by compacting the lamination stack in an axial direction of the lamination stack with a uniform surface pressure on the end face, i.e. in a direction perpendicular to the surface of the lamellae. By means of the compaction, quite a good adhesive bond is produced between the individual molded parts, and this contributes to the longevity of the lamination stack. The downstream compaction step preferably takes place outside the press in a downstream compaction station.

In a further development, the compaction can take place using displacement control instead of force control. This can be realized by an adjustable stop, for example. In combination with a very precise temperature control, the axial length of the components can be adjusted very precisely.

Alternatively, however, the compaction step can also be carried out, preferably partially or fully, using the pressure of the separating means.

The very good mechanical strength of the lamination stack achieved by gluing and post-compacting is particularly advantageous, as a result of which, for example, machining can be carried out much more easily and precisely. The requirements that increase with speed or radial velocity can therefore be implemented more easily. Another advantage is a high degree of design freedom.

Due to the uniform heating of the individual sheet (or sandwich) there results more homogeneous heating, and its associated advantages, for example with regard to better geometric properties, lower internal stresses.

The method is particularly preferably carried out using a metal sheet in which the adhesive coating has been applied to the metal sheet as an aqueous dispersion. The advantage of an aqueous dispersion is that the coating system is free of organic solvents (VOC-free).

There is also the advantage that the coated sheet dries almost tack-free, so that it can be wound up into a coil without the individual windings sticking to each other. Subsequent chemical crosslinking under pressure and temperature is still possible. Solvent-based, dissolved epoxide resin systems are generally not sufficiently high molecular weight systems for tack-free drying, with the disadvantage that the individual windings in the coil can only be unwound with difficulty, if at all, which prevents use in a subsequent process.

One embodiment therefore provides, in a particularly preferred manner, that the applied adhesive coating was not present in dissolved form in an organic solvent.

The adhesive coating preferably consists of an adhesive which has a significantly higher viscosity, in particular a significantly higher complex viscosity immediately before the onset of chemical crosslinking, under comparable baking conditions compared to commercially available baking resin systems known to the person skilled in the art, which is illustrated by the test results presented below. This results in the advantage that at the temperatures reached during the course of the method according one or more aspects of the subject disclosure, the adhesive does not liquefy but at most the adhesive becomes plastic, i.e. softens, so that the adhesive remains completely within the molded parts stack.

In particular, preference is given to using an adhesive which is not a hot-melt adhesive, that is to say an adhesive which does not become liquid at the activation temperatures described above of up to 180 degrees Celsius.

An adhesive is particularly preferably used which, immediately before the onset of chemical crosslinking, i.e. for example in a "complex viscosity (temperature)" curve at the location of the local minimum which comes closest to the temperature range of chemical crosslinking, has a complex viscosity of 8 Pa×s or higher, preferably 10 Pa×s or higher. An adhesive that does not fall below the complex viscosity mentioned, at least at a temperature below a temperature at which chemical crosslinking begins, results, in a method according to one or more aspects of the subject disclosure, in the adhesive not liquefying over a large area, but in the adhesive becoming at most paste-like at the temperatures being used, especially at the activation temperatures being used. This in turn means that a lamination stack is obtained which has excellent properties, in particular high accuracy in geometrical dimensions. Such a lamination stack is also particularly suitable for carrying out a method with a post-compacting step, which additionally promotes the high degree of high accuracy in geometrical dimensions.

The adhesive preferably contains:
60 parts by weight of an epoxide resin in solid resin form,
0.5-5 parts by weight of a latent curing agent,
1-5 parts by weight of a latent accelerator.

The adhesive preferably has 1 to 10 parts by weight of the latent curing agent, particularly preferably 2 to 5 parts by weight of the latent curing agent.

The term "latent curing agent" denotes a substance which is used to cure the epoxide resin, but which has to be activated for curing, in particular by supplying chemical and/or thermal energy. The latent curing agent is added to the adhesive as a solid in powder form, for example.

The term "latent accelerator" denotes a substance which accelerates the curing of the epoxide resin by the latent curing agent. The attribute "latent" in connection with the accelerator relates to the fact that the accelerator must also be activated beforehand by chemical and/or thermal energy in order to fulfill its function. The latent accelerator is added to the adhesive as a solid in powder form, for example.

The above composition relates to the mixture of the components present as solids in the specified parts by weight to form an adhesive mixture which, in dispersion and/or solution with a suitable liquid, becomes the adhesive which can form an adhesive coating. In a usable state, i.e. in a form suitable for coating, the adhesive having the specified components is preferably present as a dispersion of the above composition in a dispersion medium, in particular as an aqueous dispersion.

Since a metal sheet is provided with an adhesive coating made from a thermally activated adhesive, the metal sheet coated with the adhesive is used as a preliminary product for flexibly adaptable manufacturing processes for electromagnetic components, in particular stator packages or rotor packages. Because the adhesive must first be thermally activated, the adhesive function can be performed at a desired point in time or in a desired method step after the lamellae have been separated from the metal sheet, for example by punching. Within a short period of time after activation, the lamellae must be brought together after activation (optionally preferably also under partial or full-surface pressure in the press and/or in a subsequent compaction process) so that they are glued together during the chemical curing reaction. This is the only way to create flawless, non-delaminated and geometrically precise, mechanically stable stacks.

In conjunction with the adhesive composition described, the metal sheet has a surface of potentially short activation time of, for example, 0.05 to 1 seconds, preferably 0.3 to 1 seconds. These properties go hand in hand with a comparatively high temperature resistance and a comparatively high insulating capability and aging resistance.

The epoxide resin present in the adhesive that is used in aspects of the subject disclosure comprises one or more epoxide resin components with more than one epoxide group, of which preferably at least one epoxide resin has a softening point greater than 50° Celsius.

The epoxide resins can be aliphatic, cycloaliphatic or aromatic epoxide resins. Aliphatic epoxide resins contain components that carry both an aliphatic group and at least two epoxide resin groups.

Examples of aliphatic epoxide resins can be butanediol diglycidyl ether, hexanediol diglycidyl ether, dimethylpentane dioxide, butadiene dioxide, and diethylene glycol diglycidyl ether.

Cycloaliphatic epoxide resins include, for example, 3-cyclohexenylmethyl-3-cyclohexylcarboxylate diepoxide, 3,4-epoxycyclohexylalkyl-3',4'-epoxycyclohexane carboxylate, 3,4-epoxy-6-methylcyclohexylmethyl-3',4'-epoxy-o-methylcyclohexane carboxylate, vinylcyclohexane dioxide, Bis (3,4-epoxycyclohexylmethyl)adipate, dicyclopentadiene dioxide, and 1,2-epoxy-6-(2,3-epoxypropoxy)hexahydro-4,7-methanoindane.

Aromatic epoxide resins include, for example, bisphenol A epoxide resins, bisphenol F epoxide resins, phenol novolac epoxide resins, cresol novolac epoxide resins, biphenyl epoxide resins, biphenol epoxide resins, 4,4'-biphenoline epoxide resins, divinyl benzene dioxide, 2-glycidyl phenyl glycidyl ether, and tetraglycidyl methylene dianiline.

In one embodiment, the epoxide resin is bisphenol A epoxide resin.

The latent curing agent used is a substance or a mixture of substances which preferably enter into curing reactions with the epoxide resins of the adhesive at temperatures in the range of from 80° Celsius to 200° Celsius.

The curing agent can contain dicyandiamides, aziridine derivatives, triazine derivatives, imidazolines, imidazoles, o-tolyl biguanide, cyclic amidines, organic hexafluoroantimonate or hexafluorophosphate compounds or BF3 amine complexes. The compounds can be used individually or in combination.

Examples include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-Benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-2,4-diamino [2''methylimidazolyl-(1')]-ethyl-s-triazine, 2-phenylimidazole, 2-phenyl-4,5-dihydroxymethylimidazole, 2-phenyl-4-methyl-5-hydroxymethylimidazole, 2,3-dihydro-1H-pyrrolo [1,2-a] benzimidazole, (1-dodecyl-2-methyl-3-benzyl) imidazolium chloride, 2-methylimidazoline, 2-phenylimidazoline, 2,4-diamino-6-vinyl-1,3,5-triazine, 2,4-diamino-6-vinyl-1,3,5-triazine isocyanic acid adduct, 2,4-diamino-6-methacryloyloxyethyl-1,3,5-triazine, 2,4-diamino-6-methacryloyloxyethyl-1,3,5-triazine isocyanic acid adduct, 1,3,5-triazine, 2,4-diamino-6-methyl-1,3,5-triazine, 2,4-diamino-6-nonyl-1,3,5-triazine, 2,4-diamino-6-phenyl-1,3,5-triazine, 2,4-dimethoxy-6-methyl-1,3,5-triazine, 2,4-dimethoxy-6-phenyl-1,3,5-triazine, 2-amino-4,6-dimethyl-1,3,5-triazine, 2-amino-4-dimethylamino-6-methyl-1,3,5-triazine, 2-amino-4-ethoxy-6-methyl-1,3,5-triazine, 2-amino-4-ethyl-6 methoxy-1,3,5-triazine, 2-amino-4-methoxy-6-methyl-1,3,5-triazine, 2-amino-4-methyl-6-phenyl-1,3,5-triazine, 2-chloro-4,6-dimethoxy-1,3,5-triazine, 2-ethylamino-4-methoxy-6-methyl-1,3,5-triazine, and 1-o-tolyl biguanide.

In one embodiment of the subject disclosure, the accelerator contains a urea derivative and/or an imidazole.

The adhesive composition can also contain further components.

It is preferred if the curing agent contains a dicyandiamide, an imidazole, a BF3 amine complex or a combination thereof.

In one embodiment, the adhesive can contain 1 to 10 parts by weight of a latent accelerator, preferably 1 to 5 parts by weight of a latent accelerator, particularly preferably 1 to 4 parts by weight of a latent accelerator.

In another preferred embodiment, the adhesive furthermore has 0.2 to 8 parts by weight, preferably 0.2 to 5 parts by weight of a dye. As a result, the visual appearance of the surface can be made more pleasing. The dye can be selected from the group consisting of lamp blacks, iron oxide black pigments, or water-soluble dyes, or a mixture of a plurality of the aforementioned.

The adhesive preferably contains one or more of the insulation additives known to a person skilled in the art, wherein the term "insulation additives" refers to additives specifically provided to increase the electrical resistance of the adhesive. The insulation additives can be contained in the adhesive in amounts of from 1 to 10 parts by weight, preferably 1 to 5 parts by weight.

The adhesive preferably contains one or more of the anti-corrosion additives known to those skilled in the art.

The anti-corrosion additives can be contained in the adhesive in amounts of from 1 to 10 parts by weight, preferably 1 to 5 parts by weight.

In a variant of the method, the latent accelerator contains a urea derivative.

The latent accelerator contained in the adhesive preferably consists of at least 50 wt.-%, more preferably at least 90 wt.-%, even more preferably consists completely of urea derivative.

Particularly preferably, the urea derivative is an N,N-dimethylurea or an N,N'-dimethylurea or a bifunctional urea derivative, preferably with two urea groups as functional groups, very particularly preferably a 4,4'-methylene-bis-(phenyldimethylurea), or a mixture of a plurality of the above.

The latent accelerator contained in the adhesive preferably consists of at least 50 wt.-%, more preferably at least 90 wt.-%, even more preferably at least 98 wt.-%, and particularly preferably consists completely of 4,4'-methylene-bis-(phenyldimethylurea).

In an alternative of the method, an asymmetrically substituted urea is also used, or exclusively so, as the urea derivative.

In an alternative development, a urea derivative is used in which at least one, preferably 2, particularly preferably 3, hydrogen atoms are replaced, independently of one another, by alkyl groups and/or phenyl groups which in turn may be further substituted. The alkyl groups are preferably methyl, ethyl, propyl or butyl, preferably methyl groups; the phenyl group are phenyl or a deeply-substituted find, preferably at position 4, also preferably as a cool 1 of the above-mentioned alkyls. In a further alternative, a difunctional urea derivative is denoted as an above-described derivative which has 2 functional groups. Functional groups are groups of atoms that significantly determine the material properties and, in particular, the reaction behavior of the compound; in particular, the functional groups enter into reactions. Furthermore, the urea derivative to be used is halogen-free. In an alternative, the urea derivative to be used has 2 urea derivatives as functional groups. As a result, epoxide resins can advantageously be cured without the presence of dicyanamides as crosslinkers.

A substance that can also be provided as a urea derivative

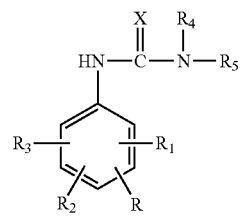

is one in which R is hydrogen or a group according to

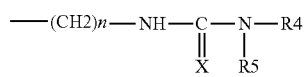

where
n=0 or 1, preferably 1,
X=0 or S, preferably 0,
R1, R2 and R3 are each hydrogen, a halogen, nitro group, a substituted or unsubstituted alkyl group, alkoxyl group, aryl group or aryloxyl group, R4 is an alkyl group, alkenyl group, cycloalkyl group, cycloalkenyl group, aralkyl group optionally substituted by a halogen, hydroxyl or cyano, preferably methyl, ethyl, propyl, butyl, particularly preferably methyl, R5 is the same as R4 or is an alkoxyl group, optionally R5 forms a heterocyclic ring with R4, or an N,N-dimethyl-N'-(3,4-dichlorophenyl)urea or an N,N-dimethyl-N'-(3-chloro-4-methylphenyl)urea or an N,N-dimethyl-N'-(3-chloro-4-methoxyphenyl)urea or an N,N-dimethyl-N'(3-chloro-4-ethylphenyl)urea or an N,N-dimethyl-N'-(4-methyl-3-nitrophenyl)urea or an N—(N'-3,4-dichlorophenylcarbamoyl)morpholine or an N,N-dimethyl-N'(3-chloro-4-methylphenyl)thio-urea, the urea derivative is preferably 4,4'-methylene-bis-(phenyldimethylurea) or a mixture of two, three or more of the aforementioned. Such a mixture preferably contains at least 10%, 25%, preferably 50%, 60%, 70%, 80% or 90% of 4,4'-methylene-bis-(phenyldimethylurea).

The advantage of urea derivatives of the type mentioned can be seen in GB 1293142 A. The inventors have found that such derivatives can be used excellently for the production of electromagnetic components.

The mean particle size (arithmetic mean) of the urea derivative is preferably between 1 micrometer and 30 micrometers.

The adhesive coating can be applied to the metal sheet on one or both sides. If an adhesive coating is applied on both sides, the thickness of the coating can be the same, but different thicknesses can also be provided.

The preferred thickness of the adhesive coating, i.e. the thickness of the coating on one side in the case of a one-sided adhesive or the total thickness of the adhesive coating on both sides in the case of a two-sided adhesive coating, is between 1 micrometer and 20 micrometers, preferably between 2 micrometers and 10 micrometers. A total thickness of between 4 and 8 micrometers is particularly preferred.

Coating the sheet with adhesive on one side is associated with simpler production in terms of apparatus, coating the sheet with adhesive on both sides is in turn associated with the advantage that when individual lamellas made from metal sheet are positioned one on top of the other, adhesive surface is positioned against adhesive surface, resulting in improved adhesion and thus a higher mechanical stability of the electromagnetic component is achieved, which has been shown in tests.

The first partial coating of the first metal sheet surface and the second partial coating of the second metal sheet surface with a second thickness are particularly preferably adapted to one another in such a way that the first thickness is at least 1.5 times, preferably twice the second thickness. In such a configuration, the first thickness is responsible for excellent insulation, so that the risk of adhesive gaps is almost negligible, while the thinner of the two, namely the second partial coating applied with the second thickness, substantially serves to produce the excellent adhesion.

A double-sided coating with a total thickness of both coatings between 4 and 6 micrometers is very particularly advantageous. Such a small coating thickness is possible with the adhesives used according to the subject disclosure of the invention because of their high reactivity, as the examples produced show. Known baking coating adhesives usually require a coating thickness greater than 6 micrometers (e.g. baking coating on both sides, 5 µm on each side). This results in the advantage that components, in particular stators or rotors, can be produced from the metal sheets, which have a significantly higher iron fill factor than components produced by means of the baking coating method. The advantage is a somewhat higher efficiency of the electric machine having the component. But adhesive coatings between a total of 1 and 20 micrometers, preferably 2 and 8 micrometers, can be provided.

In a further alternative, a pretreatment, an adhesion promoter, a phosphating and/or an insulator, for example in the form of an insulating resin coating, is disposed between the metal sheet and the adhesive layer and/or only the insulating resin coating is disposed on the side of the metal sheet opposite the adhesive layer, or the surface is uncoated.

The metal sheet is particularly preferably designed as non-grain-oriented electrical steel, also referred to as so-called NO electrical steel, or is separated from such, the non-grain-oriented electrical steel strip containing the following elements in addition to Fe and unavoidable impurities (all figures in % by weight):

0.1-3.50 Si,
0.01-1.60 Al,
0.07-0.65 Mn,
optionally up to 0.25 P.

It goes without saying that the totality of all alloy components and the impurities add up to 100% wt.-%.

The following conditions are particularly preferred (all data in wt.-%):

2.3-3.40 Si,
0.3-1.1 Al,
0.07-0.250 Mn,
optionally up to 0.030 P, remainder Fe and unavoidable impurities.

It goes without saying that the totality of all alloy components and the impurities add up to 100% wt.-%.

The non-grain-oriented electrical steel strip or the non-grain-oriented metal sheet preferably has a yield strength in the longitudinal direction under standard normal conditions of from 190 to 610 MPa and a maximum tensile strength of from 310 to 740 MPa and a minimum elongation at break A80 of from 6 to 48%, measured in accordance with DIN EN ISO 6892-1, and an Hv5 hardness of 100-250.

In a particularly preferred embodiment, the material has a yield strength in the longitudinal direction at room temperature of from 310 to 600 MPa and a maximum tensile strength of from 400 to 640 MPa and an elongation at break A80 of from 7 to 32%, measured in accordance with DIN EN ISO 6892-1, and an Hv5 hardness of 130-250.

The material preferably exhibits anisotropy at P1.0; 400 Hz in the range of from 5 to 17%.

Sheet metals, in particular electrical steel strip, with a thickness between 0.05 and 2.5 mm are suitable and preferably used, with thicknesses between 0.1 and 1.0 mm being preferred. Thicknesses between 0.15 and 0.4 mm are particularly preferred.

Alternatively, the metal sheet can be a multilayer composite (sandwich) made up of a metal sheet layer, for example made of one of the electrical strips described above, and one or more additional layers, for example with an acoustically damping functional layer (e.g. bondal E). Furthermore, the metal sheet can also be coated on one or both sides with an acoustically damping functional layer (e.g. semi-bondal E), so that the described adhesive system connects directly to the acoustically damping functional layer (e.g. an acrylate chemical base). It is known from the art that epoxide resin systems have good compatibility.

Alternatively, the metal sheet can have an acoustically damping functional layer on one side and an adhesive layer to be used according to aspects of the present disclosure on the opposite metal sheet side.

In an advantageous development, steps C) to F) of the method can be carried out with a rise rate of at least 80/min, preferably between 120/min and 300/min. If the requirements for the adhesive connection or smaller electrical components are lower, a rise rate well over 300/min can also be achieved.

One idea of the present disclosure relates to a lamination stack or a stacked section of a lamination stack for an electric machine, the stack being produced using a method of the type described in the introduction or one of its developments. In particular, the lamination stack or the stack section is designed as a stator or as a rotor.

The subject disclosure also includes an electric machine, in particular an electric motor, which has a stator and/or a rotor which was produced using a method according one or more aspects of the subject disclosure.

In one development, the electric machine has a stator and a rotor, the stator being partially or completely a lamination stack that is produced using the method according to one or more aspects of the present disclosure, and the rotor being partially or completely a component produced by means of punch-stacking methods known to a person skilled in the art. The stator, which is particularly demanding in terms of electromagnetic efficiency, is thereby provided with excellent electromagnetic properties, while the rotor, which is less demanding in terms of its electromagnetic properties in many applications, is manufactured using conventional punch-stacking, which is very cost-effective. An electric machine is consequently provided which offers a good trade-off between good electromagnetic properties and cost-effective manufacture.

Further details, features, and advantages of the subject matter of the present disclosure result from the following description in connection with the drawings, which show embodiments by way of example.

DETAILED DESCRIPTION

It goes without saying that the features mentioned above and below can be used not only in the combination indicated but also in other combinations or in isolation.

EXAMPLES

Figure 1:
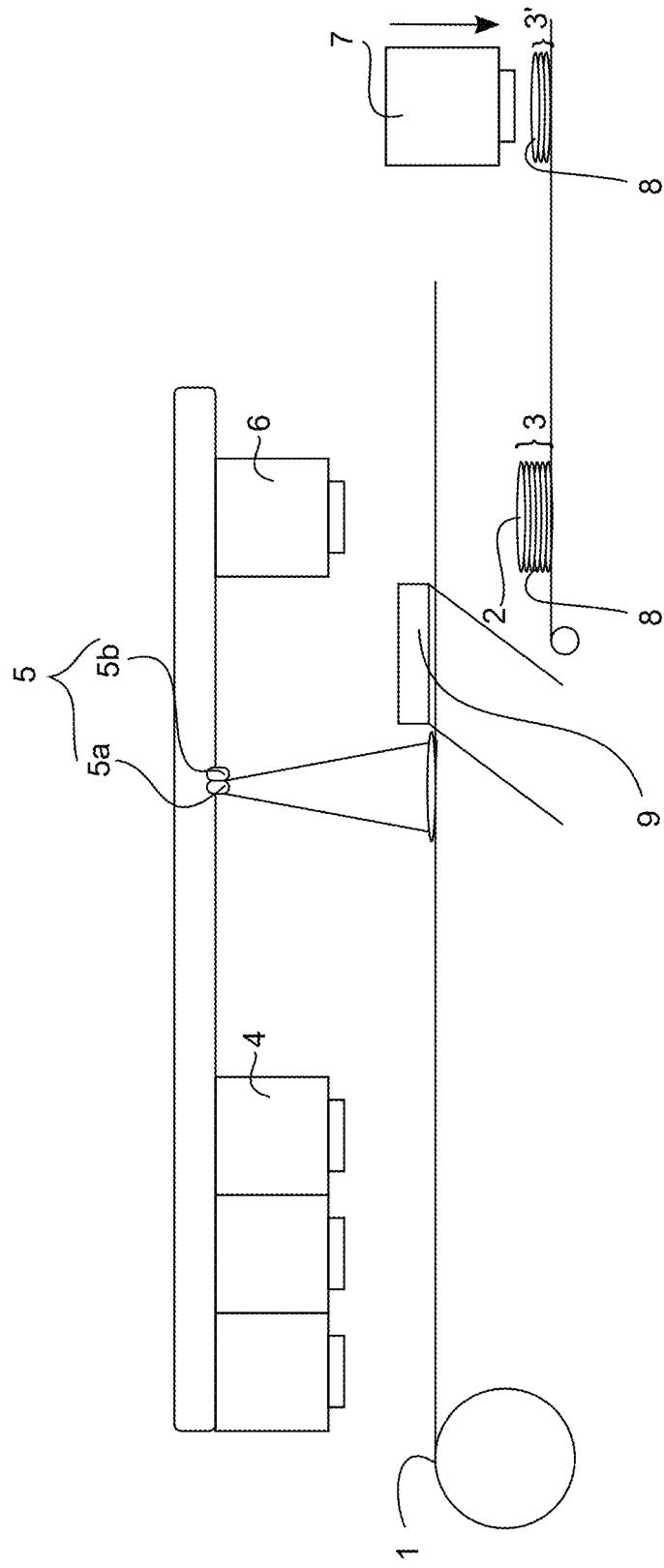
FIG. 1 is a schematic view of a lamination stack for an electric motor according to one embodiment of the subject disclosure.

An example of a first embodiment of the method for producing a lamination stack for an electric motor is shown in FIG. 1. A metal sheet already coated with an adhesive is provided, namely as a non-grain-oriented electrical steel strip 1, coated with an adhesive of the type provided according to embodiments described herein. This strip is transported into an inline system. In a first station, a number of punches 4 cut out molded parts 2 which are designed as rotor lamella or stator lamella. In a subsequent station, the molded part is irradiated using a means designed as an NIR emitter for outputting infrared radiation 5, and the resulting heating activates the adhesive coating of the molded part. The activation means 5 has a first infrared illuminant 5a and a second infrared illuminant 5b. The illuminant 5a emits radiation at wavelengths of 780 nm and 1200 nm, while the second illuminant emits radiation at wavelengths of 1200 nm and 3000 nm. By irradiating at different wavelengths, a more uniform activation of the adhesive coating is achieved in the direction perpendicular to the sheet surface, with the higher efficiency also allowing a higher rise rate, since a shorter period of time is required to activate the adhesive coating.

Certain lamellae are coated using the treatment device 9 designed as a coating roller, in order to function as a target breaking point between individual lamination stacks in the subsequent molded parts stack. Whenever a specified number of molded parts has been reached, the coating roller 9 moves to the metal sheet, in the representation shown into the plane of the paper, and coats the next molded part after the specified number reached in order to reduce or completely eliminate the effect of the adhesive coating. The coated molded part then has a target breaking point at which the molded parts stack can be separated into stack sections, preferably in a continuously running process, and each of the stack sections represents the finished lamination stack. In the manufacture of the molded parts stack, the lamella 8 was a lamella that corresponded to a predefined number of molded parts that had been reached. For this reason, it was coated with a punching oil using the coating roller 9 adapted as a treating device, and thereby it has a reduced adhesive strength.

The molded part is then pressed out using the separating means 6 designed as a cutting die and collected and pre-fixed in a positioning area to form a stack 3 in a positioned and/or angularly-aligned manner, i.e. the lamellae provided with an activated adhesive coating adhere to one another simply because of their own weight.

In the state of removal, the lamination stack is the stack section of the molded parts stack that has been removed at the target breaking point 8 and has a reduced-effective adhesive coating on lamina 8. The stack sections can either be removed by their own weight or separated from the molded parts stack by means of equipment or manual support. In the present example, there are two separate stack sections which are post-compacted in a subsequent step as stack section 3' in compaction station 7.

Finally, in a compaction station, compaction with a compaction ram 7 takes place until the adhesive has cured and the finished lamination stack can be removed.

Examples of a metal sheet according to the subject disclosure and its advantageous behavior for the method according to the subject disclosure are given in tests that were carried out.

The following samples were produced:

Sheets made from electrical steel strip M800-50A (according to EN 10027-1) with the material code 1.0816 (according to EN 10027-2), thickness 0.5 mm, length× width: 200×150 mm.

Samples 0, 1, 2 and 3 were prepared. Samples 0, 1 and 2 are comparative samples, they are coated with an adhesive.

Sample 3 is an advantageous sample.

The samples prepared are sheets of the type mentioned above which have been coated with adhesive using an application roller according to the following parameters:

| Sample name | Parts by weight of epoxide resin (present as solid resin) | Parts by weight of curing agent | Parts by weight of accelerator | Selected accelerator |
|---|---|---|---|---|
| Sample 0 | 60 | 3.5 | 4.5 | Conventional accelerator (DYHARD URAcc57, brand name) |
| Sample 1 | 60 | 3.5 | 3.0 | Conventional accelerator (DYHARD URAcc13, brand name) |
| Sample 2 | 60 | 3.5 | 3.0 | Conventional accelerator (DYHARD URAcc13, brand name) |
| Sample 3 | 60 | 3.5 | 3.0 | 4,4'-methylene-bis-(phenyldimethylurea) |

Layer thicknesses

Sample 0: 1st surface: 6 µm, 2nd surface 0 µm,
Sample 1: 1st surface: 6 µm, 2nd surface 0 µm,
Sample 2: 1st surface: 4 µm, 2nd surface 2 µm,
Sample 3: 1st surface: 4 µm, 2nd surface 2 µm.

A plurality of specimens of each of the sample types was prepared. To test the long-term stability, 18 sandwich structures each were made of two identical samples.

Figure 2A:
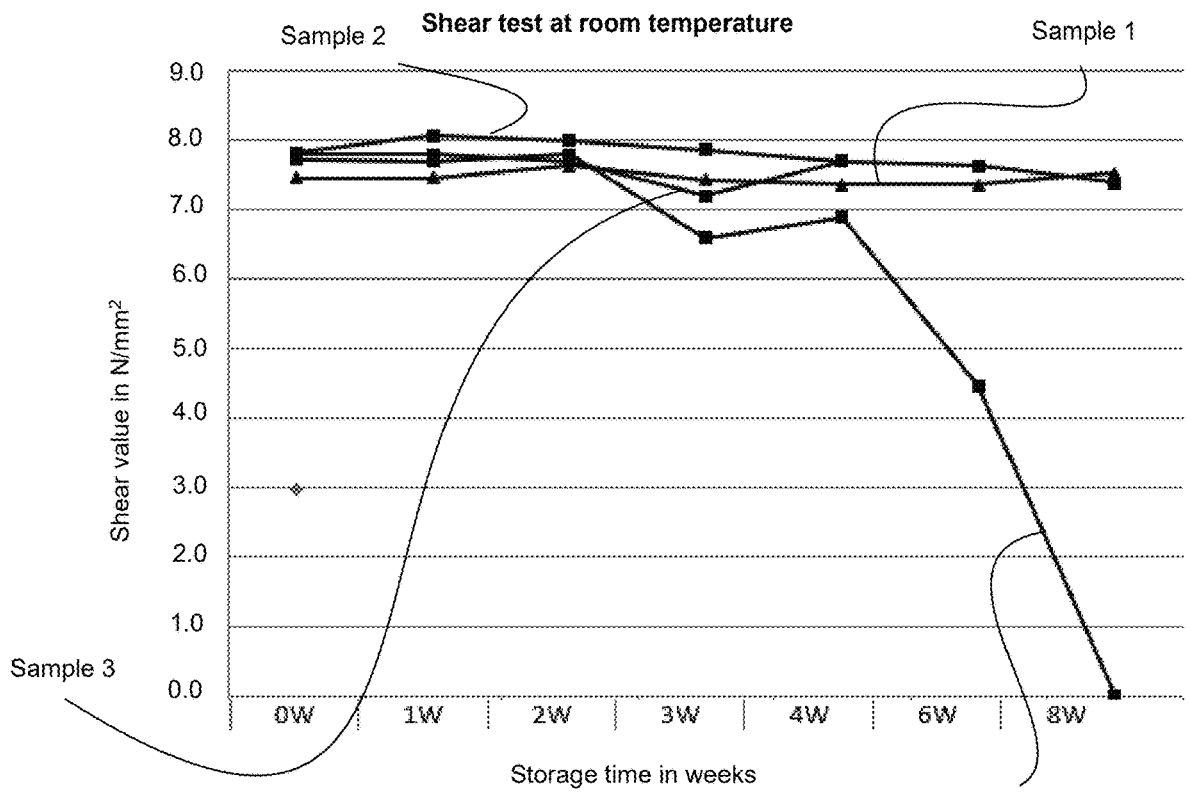
FIGS. 2A and 2B show the results of tests for various samples (Samples 0, 1, 2 and 3), particularly showing storage time versus shear value.
Figure 2B:
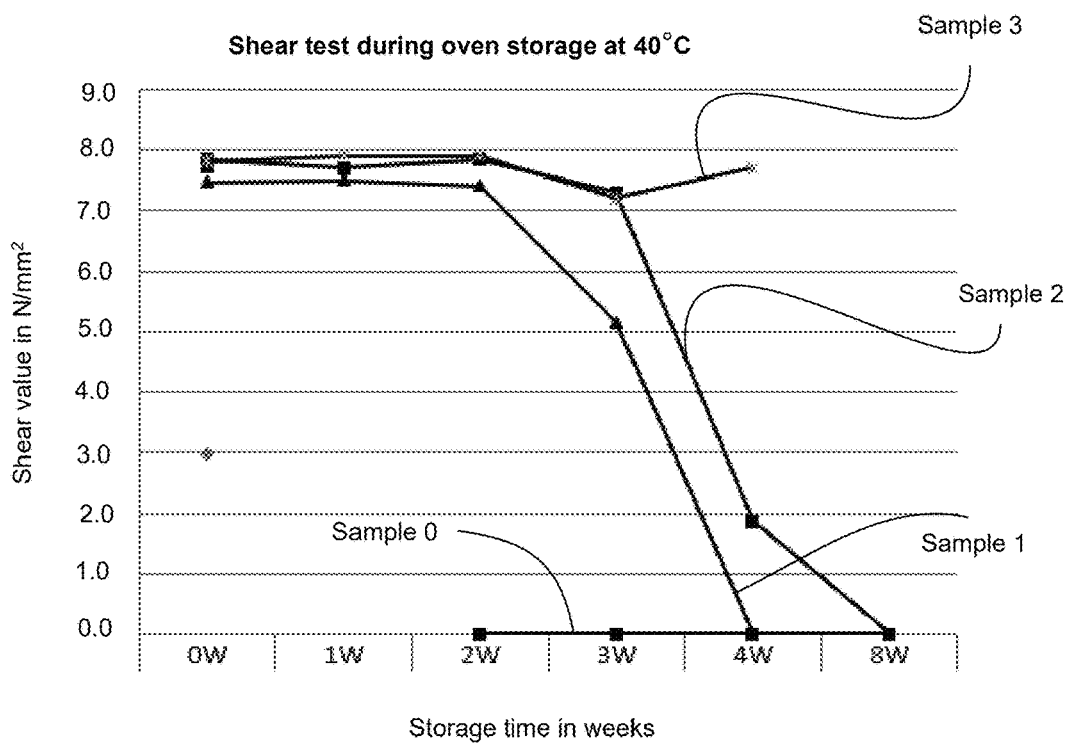

Two samples of the same type were bonded using a plate press with a plate area of 200 mm×200 mm with a surface pressure of 3 N/mm², the adhesive being activated in an oven by heating to 120° C. and holding at 120° C. for 30 minutes. Then 8 samples were placed in an oven and stored there at 40° C. A sample was taken every week and a shear value test was performed (based on DIN EN 1465). In addition, a shear value test was performed every week on specimens stored at room temperature. The results of the test are shown in FIGS. 2a and 2b.

It can be seen from the results that, at room temperature, the composition used according to the subject disclosure has better shear values than the reference samples sample 0, sample 1 and sample 2. Sample 0 tested after six weeks had a significantly reduced shear value; after 8 weeks, sample 0 had a shear value of 0.

Storage at 40 degrees Celsius results in a shear value of 0 for the reference sample 0 after one week at the latest, i.e. the sample has no storage stability at 40 degrees Celsius. After 2 weeks, sample 1 and sample 2 had an almost unchanged good shear value of over 7.0 N/mm², but began to degrade noticeably after three weeks of storage.

In all cases, the shear value of sample 2 with a surface coated on both sides is higher than the shear value of sample 1 with a surface coated on one side. This is proof of the particularly advantageous effects associated with metal sheet coated on both sides.

In particular, it can be seen that sample 3 has the best storage stability with an almost unchanged good shear value after 4 weeks at 40 degrees Celsius storage. The only sample that could be obtained was a sandwiched sheet which, even after four weeks of storage at 40 degrees Celsius, still had an unchanged good shear value. At the time of submission of the application, the tests were still ongoing.

In addition, tests were carried out on the finished sandwiches, they were heated to test temperatures and then, after briefly holding them under heat, also subjected to a shear value test.

| Shear values [N/mm²] mean value from 3-fold test in each case | Sample number | | | |
|---|---|---|---|---|
| | Sample 2 | | Sample 3 | |
| | [N/mm²] | Standard dev. | [N/mm²] | Standard dev. |
| RT | 5.55 | 0.88 | 6.01 | 0.26 |
| 50 degrees Celsius | 5.08 | 1.32 | 5.85 | 0.11 |
| 100 degrees Celsius | 5.38 | 0.27 | 5.59 | 0.12 |
| 150 degrees Celsius | 4.89 | 0.42 | 5.22 | 0.08 |
| 200 degrees Celsius | 4.66 | 0.46 | 4.96 | 0.04 |

The results show that both sample 2 and sample 3 can withstand high temperatures of up to 200° C. over a certain period of time without losing their mechanical stability. In particular, it can be seen that the shear values of sample 3 are significantly higher than those of comparison sample 2.

Sample 0 was subjected to the temperature test as a reference, it was shown that a shear value of about 0.90 NI/mm² was obtained after heating to 150° C. On the basis of sample 3, it was thus found that the metal sheets according to the subject disclosure are suitable for the production of more temperature-stable lamination stacks compared to metal sheets that are already known.

Figure 3:
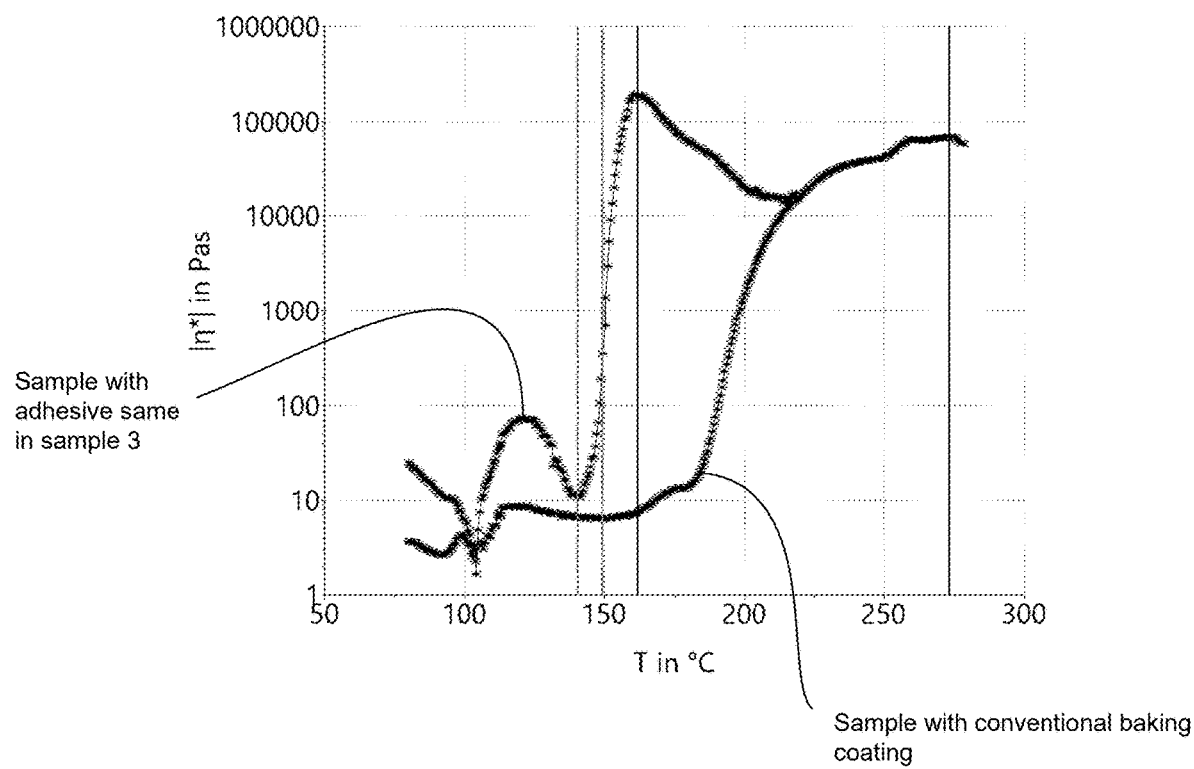
FIG. 3 shows a sample according to the subject disclosure against a sample with a conventional baking coating, particularly showing a significantly higher complex viscosity for the sample according to the subject disclosure.

In FIG. 3 it can be seen from tests that have been carried out that the advantageous adhesive, which has the same composition as that used in sample 3, has significantly higher complex viscosities than commercially available baking coatings, even at temperatures in the region of 100 degrees Celsius. In particular, the complex viscosity immediately before the cross-linking reaction, at a value of 10.74 Pa×s, is significantly higher than the values achieved with a conventional baking coating. This favors the fact that metal sheets provided with such an adhesive coating can be used advantageously for a method according to the subject disclosure and in particular also for its development, which provides for post-compacting, since the adhesive does not liquefy, but at most a transition into a paste-like behavior takes place. As a result, no appreciable flow of adhesive from the lamination stack can be observed, along with the corresponding advantages, in particular for good adhesion, which can be verified with top-pull tests, for example.

Other tests, not shown, showed in long-term tests lasting 70 days that sample 3 was qualitatively equivalent to each of samples 0 to 2 in terms of its oil resistance, i.e. in shear value tests there was no reduction in adhesion of the lamellae to each other after 70 days of storage in an oil at 150 degrees Celsius.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for producing a lamination stack for an electric machine, comprising the following steps:
   A) providing a metal sheet provided with an at least partially curable polymer-based adhesive coating or a plurality of metal sheets provided with an at least partially curable polymer-based adhesive coating, B) transporting the metal sheet into an inline system comprising: at least one cutting means, a separating means and an activating means for activating the adhesive coating,
C) cutting a molded part from the metal sheet provided in step A using the at least one cutting means,
D) activating the adhesive coating of the molded part using the activating means for activating the adhesive coating of the molded part,
E) separating the molded part from the metal sheet using the separating means,
F) placing the molded part in a positioning area for forming a molded part stack,
G) repeating steps C) to F) to continuously fill the positioning area with molded parts, wherein after a predefined number of molded parts has been reached, with regard to the next molded part, before carrying out step F) said next molded part is provided at least in areas with a treatment fluid using a treatment device to reduce the effect of the adhesive coating on this subsequent molded part such that the adhesive coating of this subsequent molded part, in the positioning area as a result of the reduced adhesive coating, causes improved separability of a stack section below the adhesive coating of reduced effect from a stack section above the adhesive coating of reduced effect.

2. The method according to claim 1, wherein the activating means comprises a first infrared illuminant and the adhesive coating is illuminated with infrared radiation and thereby activated.

3. The method of claim 2, wherein the activating means comprises a second infrared illuminant, the first infrared illuminant and the second infrared illuminant emitting infrared radiation of different wavelengths to activate the adhesive coating at different activation depths.

4. The method of claim 3, wherein the first infrared illuminant has a wavelength between 780 nm and 1200 nm emits and the second infrared illuminant has a wavelength between 1200 nm and 3000 nm.

5. The method according to claim 1, wherein the activating means comprises an induction heater.

6. The method according to claim 1, wherein
the treatment fluid is a separating fluid and the treatment device is a coating unit with which the separating fluid is applied to the adhesive coating as a treatment of the adhesive coating, or
the treatment fluid is a cooling fluid and the treatment device is a wetting unit with which the cooling fluid is applied to the adhesive coating as a treatment of the adhesive coating.

7. The method according to claim 1, wherein the treatment fluid is a separating liquid in the form of stamping oil.

8. The method according to claim 1, wherein after a stack section has been separated, the stack section is post-compacted in a press with a pressure on the end face.

9. The method according to claim 1, wherein the adhesive coating is applied to the metal sheet as an aqueous dispersion and/or
the adhesive coating has a complex viscosity that is at least 8 Pa×s immediately prior to the onset of chemical crosslinking.

10. The method according to claim 1, wherein the adhesive coating contains:
60 parts by weight of an epoxy resin in solid resin form,
0.5-15 parts by weight of a latent curing agent,
1-15 parts by weight of a latent accelerator.

11. The method according to claim 1, wherein the metal sheet provided in step A) is provided with the adhesive coating on both sides.

12. The method according to claim 1, wherein the latent accelerator contains a urea derivative.

13. The method of claim 12, wherein the urea derivative a substance

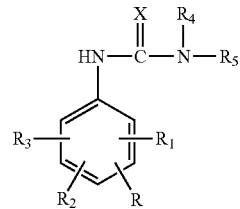

containing R: hydrogen or a group according to

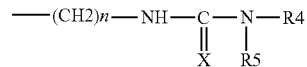

where
n=0 or 1,
X=O or S,
R1, R2 and R3 are each hydrogen, a halogen, nitro group, a substituted or unsubstituted alkyl group, alkoxyl group, aryl group or aryloxyl group,
R4 is an alkyl group, alkenyl group, cycloalkyl group, cycloalkenyl group, aralkyl group optionally substituted by a halogen, hydroxyl or cyano, methyl, ethyl, propyl, butyl,
R5 is the same as R4 or is an alkoxyl group, R5 optionally forming a heterocyclic ring with R4,
or is an N, N-dimethyl-N'-(3,4-dichlorophenyl) urea or an N,N-dimethyl-N'-(3-chloro-4-methylphenyl) urea or an N,N-dimethyl-N'-(3-chloro-4-methoxyphenyl) urea or an N,N-dimethyl-N' (3-chloro-4-ethylphenyl) urea or an N, N-dimethyl-N'-(4-methyl-3-nitrophenyl) urea or an N—(N'-3,4-dichlorophenylcarbamoyl) morpholine or an N,N-dimethyl-N' (3-chloro-4-methylphenyl)thiourea.

14. The method according to claim 12 wherein the urea derivative is or includes 4,4'-methylene-bis-(phenyldimethylurea).

15. The method according to claim 1, wherein steps C) to F) are carried out with a rise rate of at least 80/min.

16. The method according to claim 1, wherein stack sections which are separated from one another due to an adhesive coating of reduced effect, or which are provided with target breaking points, are removed separately from the molded part stack formed by filling the positioning area with molded parts.

17. A lamination stack for an electric machine, produced as a stacked section, using a method according to claim 16, in particular designed as a stator or as a rotor.

18. An electric machine, in particular electric motor, having a stator and/or a rotor according to claim 17.

19. The electric machine according to claim 18, comprising a stator and a rotor, wherein the stator is partly or completely the lamination stack and the rotor is partly or completely a component manufactured by means of punch-stacking.

20. The method according to claim 1, wherein the lamination stack is either a stator core or a rotor package.

21. The method according to claim 1, wherein the activating means is disposed between the at least one cutting means and the separating means for activating the adhesive coating.

22. The method according to claim 1, wherein the molded part is designed as a stator lamella or as a rotor lamella.

* * * * *